(12) United States Patent
Kabir et al.

(10) Patent No.: US 7,950,868 B2
(45) Date of Patent: May 31, 2011

(54) MODULAR CRANKSHAFT

(75) Inventors: Omar M. Kabir, Waller, TX (US); Kent Pearl, Katy, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 12/479,447

(22) Filed: Jun. 5, 2009

(65) Prior Publication Data

US 2009/0235779 A1    Sep. 24, 2009

Related U.S. Application Data

(63) Continuation of application No. 11/358,450, filed on Feb. 21, 2006.

(51) Int. Cl.
- *F16C 11/06* (2006.01)
- *F16D 3/80* (2006.01)
- *F16L 17/00* (2006.01)

(52) U.S. Cl. .......... 403/34; 403/35; 403/36; 403/37; 403/292; 403/297; 403/335; 403/337

(58) Field of Classification Search .......... 403/15, 403/29, 31, 34, 36, 37, 150, 273, 274, 276, 403/279, 280, 282, 292, 297, 335, 337; 464/7, 464/182; 123/192.1–192.5; 74/594, 595, 74/598; 277/584, 641, 910; 29/451, 522.1, 29/888.08
See application file for complete search history.

(56) References Cited

U.S. PATENT DOCUMENTS

| | | | |
|---|---|---|---|
| 1,504,238 A | 8/1924 | Hildebrand | |
| 2,125,552 A * | 8/1938 | Feldhoff | 403/277 |
| 2,331,541 A | 10/1943 | Dusevoir | |
| 2,380,099 A | 3/1944 | Dusevoir | |
| 2,364,109 A | 12/1944 | Taylor | |
| 2,747,428 A | 5/1956 | Peter et al. | |
| 3,143,969 A | 8/1964 | Sanford et al. | |
| 3,212,831 A | 10/1965 | Crankshaw et al. | |
| 3,359,449 A | 12/1967 | Trask | |
| 3,368,271 A | 2/1968 | Scheffler | |
| 3,406,443 A | 10/1968 | De Ridder | |
| 3,492,054 A | 1/1970 | Boggs et al. | |
| 3,494,642 A | 2/1970 | Coberly et al. | |
| 3,729,219 A | 4/1973 | Crane | |
| 4,530,145 A | 7/1985 | Bergheim et al. | |
| 4,622,864 A * | 11/1986 | Fetouh | 74/597 |
| 4,657,306 A | 4/1987 | Koopmans et al. | |
| 4,750,761 A | 6/1988 | Watts | |
| 5,038,450 A | 8/1991 | Swars | |
| 5,197,188 A * | 3/1993 | Maus et al. | 29/888.08 |
| 5,207,120 A | 5/1993 | Arnold et al. | |
| 5,218,883 A | 6/1993 | Swars | |

(Continued)

*Primary Examiner* — Daniel P Stodola
*Assistant Examiner* — Nahid Amiri
(74) *Attorney, Agent, or Firm* — Fletcher Yoder

(57) ABSTRACT

A modular crankshaft features a connection system between modules that features opposed female receptacles. A pin having opposed beveled ends and hydraulic passages with it is inserted into the opposed receptacles. A pair of seals is disposed on the beveled ends and straddles a hydraulic fluid outlet. The crankshaft wall that defines each receptacle is designed to flex in response to applied hydraulic pressure between the seals on the tapered pin portion. A notch at the base of the receptacle in the crankshaft reduces stress concentration and enables the wall defining the crankshaft receptacle to come back when hydraulic pressure through the pin is removed. The opposed crankshaft receptacles are flanged to allow them to be pulled together over the pin. An interference fit results around the pin after the flanges are mated and the hydraulic pressure is removed.

18 Claims, 4 Drawing Sheets

U.S. PATENT DOCUMENTS

| | | |
|---|---|---|
| 5,537,971 A | 7/1996 | Pong |
| 6,869,244 B2 | 3/2005 | Anderton et al. |
| 2007/0193406 A1 | 8/2007 | Kabir et al. |
| 2011/0027008 A1 | 2/2011 | Kabir et al. |

* cited by examiner

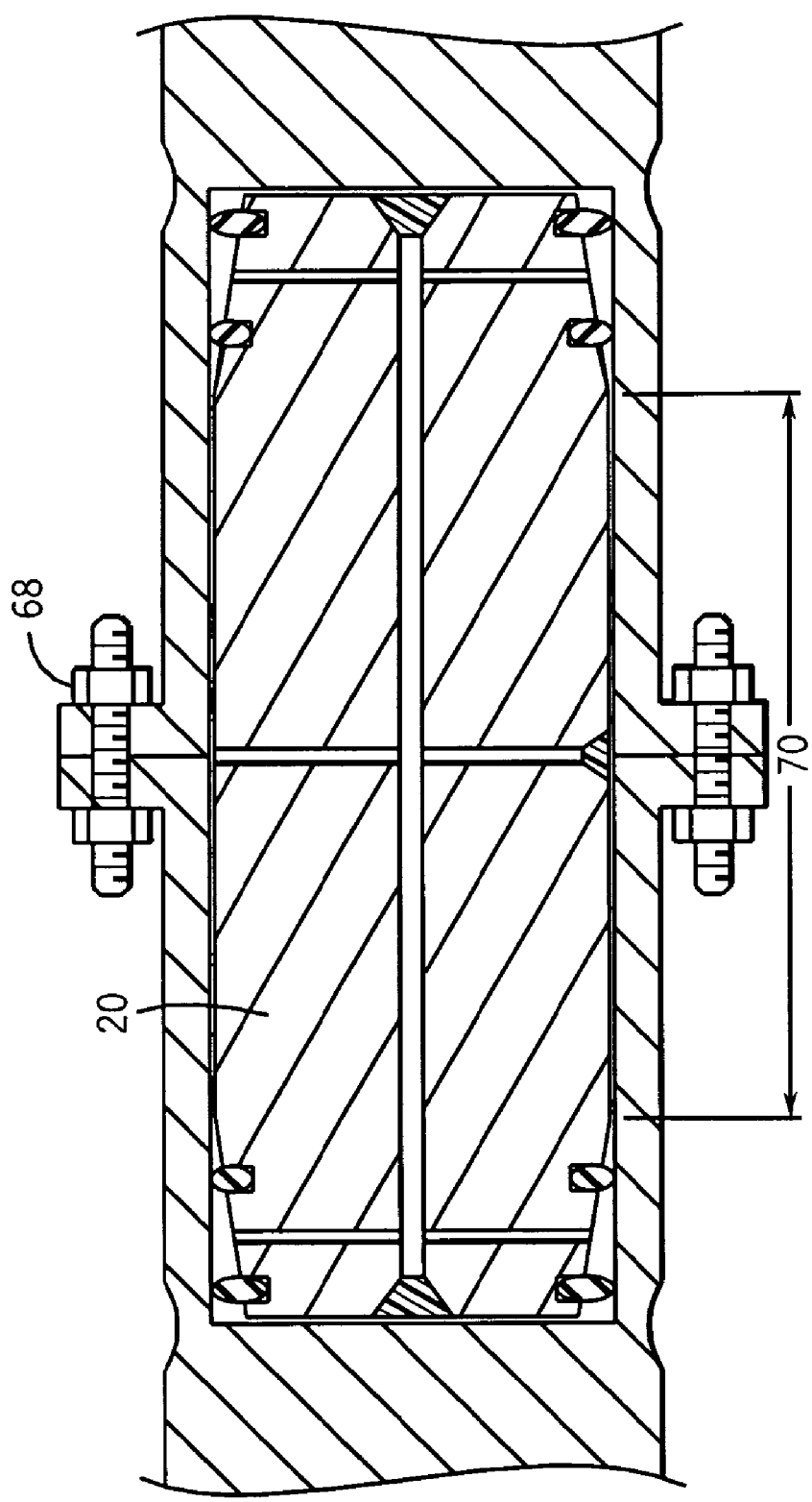

MODULAR CRANKSHAFT

CROSS REFERENCE TO RELATED APPLICATION

This application is a continuation of U.S. patent application Ser. No. 11/358,450, entitled "Modular Crankshaft", filed Feb. 21, 2006, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The field of this invention is a crankshaft that is in modular form and more specifically relates to a connection technique that approaches the rigidity of a continuous crankshaft while allowing the flexibility to be in modular form.

Crankshafts are generally cast components that accommodate the required number of throws depending on the number of cylinders in the engine or compressor. In large compressor applications, a breakdown can be very expensive for the operator in the form of lost production or other process outage until repairs can be made, for instance. When the repair involves a crankshaft, the downtime can be lengthy because vendors seldom maintain an inventory of replacement crankshafts. Instead, when a replacement crankshaft is desired, it is manufactured from scratch, which can lead to delays and undesired downtimes.

One way to address the variety in the number of throws is to create a modular design where basic components can be assembled to each other to create the requisite configuration for a particular installation. The issue that doing this raises is how to fashion a connection that will be sufficiently rigid to address issues such as alignment, relative rotation and vibration, among other issues. Prior designs have attempted to connect modules with a splined male into female connection, as is described in U.S. Pat. No. 5,537,971. The problem with this design is the bulkiness of the connection and the clearances in the splined connection that permit assembly but over time can wear to the point of permitting relative rotational movement that can cause vibration and even spline failure, for example. Another solution is depicted in U.S. Pat. No. 4,622,864. This technique freezes a pin and inserts this frozen pin into aligned bores to put the modules together. This process requires precise alignment of the pin to make sure that lubrication passages through it are not obstructed. In other respects, modular shafts that attach the modules together with threads are known, as shown in a rock breaking tool in U.S. Pat. No. 4,657,306.

Therefore, there exists a need for improved modular crankshaft connection techniques.

SUMMARY

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with certain embodiments, the present invention provides a plug with opposed tapers and spaced seal rings. Hydraulic fluid channels run to the tapered exterior between the seals and spread the opposing receptacles in the adjoining modules to allow insertion of a cylindrical portion of the pin into the respective receptacles. The receptacles are configured to flex in response to hydraulic pressure and to return to the original dimension when such pressure is removed, thus creating an interference fit. The modules are then flanged together with proper torque on the flange bolts. Those skilled in the art will appreciate the various aspects of the present invention from a review of the exemplary embodiments and the drawings that appear below, as well as from the claims.

By way of example, certain embodiments of the present invention provide a modular crankshaft that features a connection system between modules that features opposed female receptacles. A pin having opposed beveled ends and hydraulic passages therein is inserted into the opposed receptacles. A pair of seals is disposed on the beveled ends and straddles a hydraulic fluid outlet. The crankshaft wall that defines each receptacle is designed to flex in response to applied hydraulic pressure between the seals on the tapered pin portion. A notch at the base of the receptacle in the crankshaft reduces stress concentration and enables the wall defining the crankshaft receptacle to come back when hydraulic pressure through the pin is removed. The opposed crankshaft receptacles are flanged to allow them to be pulled together over the pin. An interference fit results around the pin after the flanges are mated and the hydraulic pressure is removed.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 6 is shows the pin fully advanced as the modules are connected to each other.

DETAILED DESCRIPTION OF SPECIFIC EMBODIMENTS

Figure 1:
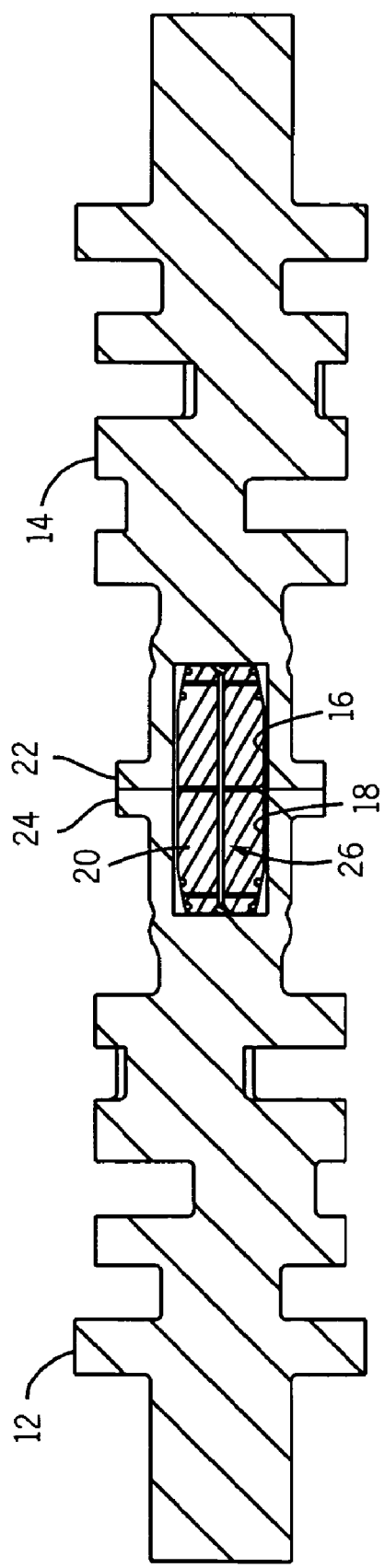
FIG. 1 is a section view of two modules joined by the attachment of the present invention, in accordance with an embodiment thereof.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The exemplary modular crankshaft 10 has at least two illustrated modules 12 and 14. The connection between them comprises facing end receptacles 16 and 18 that receive opposed ends of a pin 20. The exemplary modules have flanges 22 and 24 that can be drawn together over pin 20 to complete the connection. The pin 20 has a system of oil passages 26 through it. Details regarding the pin 20 can be better understood by reference to FIG. 2.

Figure 2:
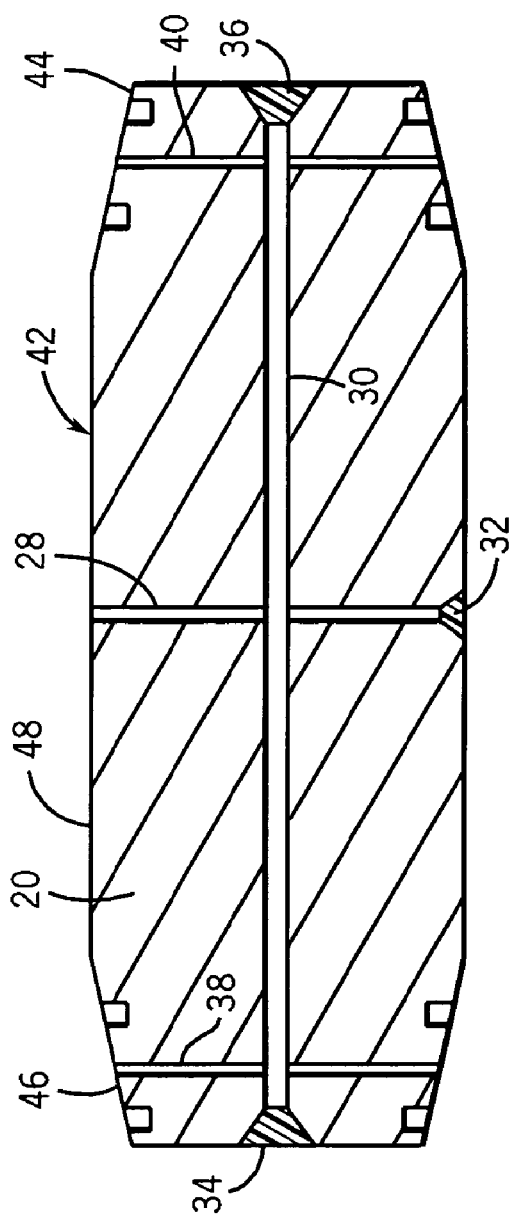
FIG. 2 is a detailed view of the exemplary pin that is used in connecting the modules.
Figure 3:
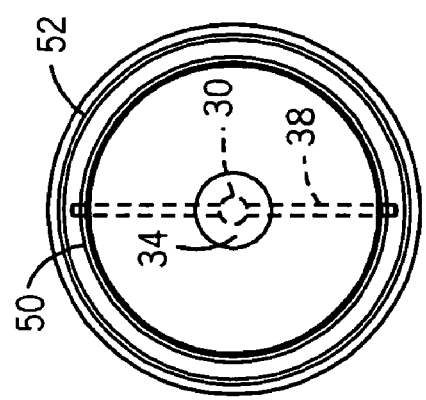
FIG. 3 is an end view of the pin of FIG. 2.

FIG. 2 shows the pin 20 having an inlet passage 28 connected to a transverse passage 30. Inlet passage 28 is sealed at 32, and transverse passage 30 is sealed at opposed ends 34 and 36. There are two oil outlet passages 38 and 40 that, as illustrated, are parallel to each other. However, it is worth noting that these passages may intersect and may be disposed in the same plane or in intersecting planes. Passages 38 and 40 can have one or more outlets on the outer surface 42 of the pin 20. Ends 44 and 46, as illustrated, present a reduced dimension when compared to the main portion 48 of the pin 20 that is located between them. That is, ends 44 and 46 present a frusto-conical section forming a truncated segment of a cone, but other shapes are contemplated. This reduced diameter profile at ends 44 and 46 facilitates interference free insertion into receptacles 16 and 18, although some interference on seals 50 and 52 at one end and seals 54 and 56 at the other end is contemplated and, in fact, desired for sealing pressure. FIG. 3 shows seals 50 and 52 on the reduced dimension portion 46. In the exemplary embodiment, the opposed end view is the same, but the invention contemplates different end treatments in accomplishing the reduced dimension. With regard to the main portion 48, the receptacles 16 and 18 can be similarly shaped. However, the main point is that the shapes of the main portion 48 and the receptacles 16 and 18 be compatible so that they ultimately produce an interference fit around main portion 48. Accordingly, other compatible cross-sectional shapes besides round are contemplated.

Figure 4:
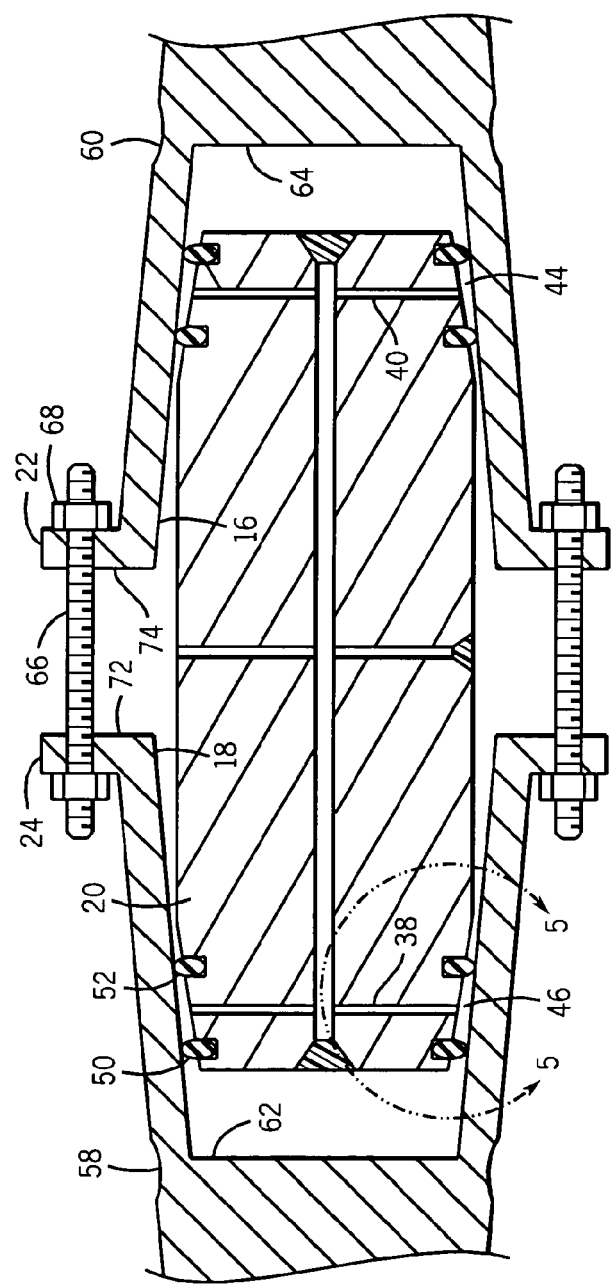
FIG. 4 is a view of the pin part way into opposing receptacles on the crankshaft modules.
Figure 5:
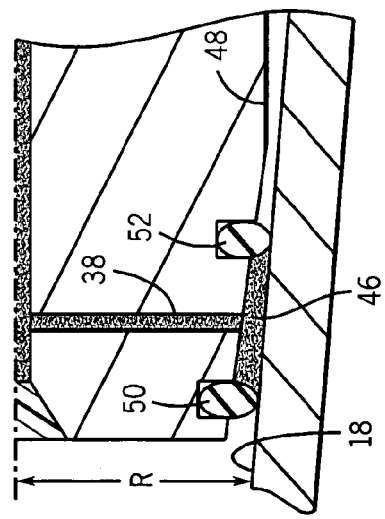
FIG. 5 is a detailed view of a pin end of the pin as it is advanced into the receptacle.

FIGS. 4 and 5 illustrate the assembly technique in more detail. FIG. 4 also illustrates exemplary circumferential recesses 58 and 60 that have a U-shaped cross-section. These recesses 58 and 60 serve to reduce stress concentrations at bottoms 62 and 64 of receptacles 18 and 16 when their dimension is enlarged so that the receptacles will elastically return to their original dimensions around pin 20 when oil pressure is removed, instead of plastically deforming under applied oil pressure. As shown in FIG. 4, ends 44 and 46 have reduced dimension to allow them to readily enter the receptacles 16 and 18. At some point of insertion, seals 50 and 52, for example, make contact with receptacle 18, while the same result occurs at the other end of pin 20 as nut 68 is rotated on threaded rod 66 bringing flanges 22 and 24 closer together. Bolts and nuts can be used as an alternative. FIG. 5 shows seals 50 and 52 contacting receptacle 18 as oil is applied under pressure through passage 38. The oil under pressure elastically enlarges the dimension of the receptacle 18 as well as the receptacle 16 through passage 40. As a result, the main portion 48 does not drag or only minimally contacts the surrounding receptacle as the flanges 22 and 24 are brought together with the oil pressure applied to passages 38 and 40 between seal pairs at opposed ends of the pin 20.

FIG. 6 illustrates the fully mated position of flanges 22 and 24. It should be noted that oil pressure is applied until the flanges mate to keep the receptacles 16 and 18 elastically enlarged to avoid hanging the pin 20 in either receptacle. As soon as the nut 68 is torqued to specification, the oil pressure is relieved and the presence of recesses 58 and 60 facilitate the elastic return to the original dimension for receptacles 16 and 18. The end result is that an interference fit is created in the zone 70 that generally corresponds to main portion 48. The modules 12 and 14 are now fully assembled. The oil line (not shown) is disconnected and capped. Those skilled in the art will appreciate that the oil inlet connection is placed adjacent a gap in the flanges 22 and 24 to allow oil access while the flanges are pulled together. Additionally, the connection described above can be undone by reversing the process and applying oil pressure while parting the flanges 22 and 24.

Those skilled in the art will appreciate that the present invention provides a unique way of joining modular crankshaft components for engines or compressors or other power equipment. The technique employs a residual interference fit to better provide continuing alignment and to guard against relative rotation, without the need for splines, for instance. The use of the oil pressure to elastically deform the receptacles allows assembly without specialized tools and shortens the time required for assembly. The recesses at the base of the receptacles 16 and 18 mitigate against the occurrence of undesirable plastic deformation and thus provide an interference fit of the pin 20 in receptacles 16 and 18. Two or more modular sections that are alike or unlike can be joined in this manner to accommodate the required number of throws or spacing desired. Pin 20 can be machined or forged. Precision instruments are not required for assembly. The exemplary mating faces 72 and 74 are precision machined so that when they are brought together the modules 12 and 14 are properly aligned. The presence of the pin 20 in receptacles 16 and 18 provides the needed rigidity to the connection under load and reduces the likelihood of deforming or deflecting or flexing under torque to allow the modular components to function as well as a unitary design. Modular components can now be kept on hand to handle a variety of applications with different number of throws so as to reduce inventory costs and to speed up repairs regardless of the crankshaft configuration using the technique of modularity described above.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a first shaft having a first annular wall disposed about a first receptacle;
a second shaft having a second annular wall disposed about a second receptacle and
a connector disposed in the first receptacle, wherein the first and second receptacles are disposed opposite from one another about the connector, the connector comprises a fluid passage extending to a first region adjacent the first annular wall and a second region adjacent the second annular wall, the connector comprises a first pair of annular seals disposed on opposite sides of the first region between the connector and the first annular wall and a second pair of annular seals disposed on opposite sides of the second region between the connector and the second annular wall, the fluid passage of the connector comprises a first outlet into the first region between the first pair of annular seals and a second outlet into the second region between the second pair of annular seals, the fluid passage comprises at least one inlet at an external intermediate region of the connector relative to the first and second receptacles, the first annular wall is elastically expandable in response to a first fluid pressure in the first region to reduce resistance during insertion of the connector into the first receptacle, the second annular wall is elastically expandable in response to a second fluid pressure in the second region to reduce resistance during insertion of the connector into the second receptacle, the first annular wall is contractible about the connector after removal of the first fluid pressure, and the second annular wall is contractible about the connector after removal of the second fluid pressure.

2. The system of claim 1, wherein the first shaft comprises a first flange disposed about the first annular wall, the second shaft comprises a second flange disposed about the second annular wall, the first and second flanges are coupled together via a plurality of fasteners, and the plurality of fasteners are configured to move the first and second annular walls toward one another about the connector while the first and second fluid pressures cause elastic expansion of the first and second annular walls.

3. The system of claim 1, wherein the at least one inlet, the first outlet, and the second outlet are disposed on an annular outer surface of the connector.

4. The system of claim 3, wherein the fluid passage of the connector comprises a central passage, a first passage, a second passage, and a third passage in fluid communication with one another, wherein the central passage is oriented along an axis of the connector, the first passage is oriented crosswise to the central passage and leads to the first outlet, the second passage is oriented crosswise to the central passage and leads to the second outlet, and the third passage is oriented crosswise to the central passage and leads to the at least one inlet.

5. The system of claim 1, wherein the first annular wall comprises a reduced wall thickness at a first annular recess, and the first annular recess is configured to facilitate elastic expansion of the first annular wall.

6. The system of claim 1, wherein the connector comprises a first conical surface disposed in the first receptacle, and the fluid passage of the connector comprises the first outlet on the first conical surface into the first region.

7. The system of claim 1, comprising a modular crankshaft having the connector, the first shaft, and the second shaft.

8. A system, comprising:
a male connector, comprising:
a body having an annular exterior surface, a central axis, a first axial end, and a second axial end;
an inlet port in the annular exterior surface;
a first outlet port in the annular exterior surface;
a passage through the body in fluid communication with the inlet port and the first outlet port; and
a first male interference fit region along the annular exterior surface adjacent the first outlet port;
a first female connector having a first annular wall disposed about a first receptacle, wherein the first male interference fit region is disposed in the first receptacle; and
a second female connector having a second annular wall disposed about a second receptacle, wherein the male connector comprises a second outlet port in the annular exterior surface in fluid communication with the passage, the male connector comprises a second male interference fit region along the annular exterior surface adjacent the second outlet port, and the second male interference fit region is disposed in the second receptacle.

9. The system of claim 8, wherein the annular exterior surface comprises a first conical surface converging toward the first axial end, and the first conical surface comprises the first inlet port.

10. The system of claim 9, wherein the annular exterior surface comprises a second conical surface converging toward the second axial end, and the second conical surface comprises the second inlet port.

11. The system of claim 8, wherein the male connector comprises a first pair of annular seals disposed on the annular exterior surface on opposite axial sides of the first outlet port.

12. The system of claim 11, wherein the male connector comprises a second pair of annular seals disposed on the annular exterior surface on opposite axial sides of the second outlet port.

13. The system of claim 8, wherein the passage is sealed relative to the first and second axial ends.

14. The system of claim 13, wherein an interior of the body is solid except for the passage.

15. The system of claim 8, wherein the passage comprises a lengthwise passage generally along the central axis, a first passage crosswise to the central axis and leading to the first outlet port, and a second passage crosswise to the central axis and leading from the inlet port.

16. The system of claim 15, wherein the passage comprises a third passage crosswise to the central axis and leading to the second outlet port.

17. The system of claim 8, wherein the inlet port is disposed at an external intermediate region relative to the first and second receptacles.

18. The system of claim 8, comprising a modular crankshaft having the male connector, the first female connector, and the second female connector.

* * * * *